Dec. 13, 1949 T. F. HAMMOND 2,491,176
WIND GAUGE AND WEATHERVANE
Filed June 20, 1947

Inventor
Thomas F. Hammond
By
Rockwell & Bartholow
Attorneys

Patented Dec. 13, 1949

2,491,176

UNITED STATES PATENT OFFICE 2,491,176

WIND GAUGE AND WEATHER VANE

Thomas F. Hammond, West Haven, Conn.

Application June 20, 1947, Serial No. 756,043

8 Claims. (Cl. 73—189)

This invention relates to a combined wind gauge and weathervane, and more particularly to a very simple structure of this type which will indicate the direction of the wind as well as its velocity.

More particularly, it relates to a structure wherein the wind gauge is mounted upon a rotatably supported weathervane, so that the wind gauge will at all times face into the wind in order that the movable parts of the gauge may be exposed directly to the force of the wind and thus actuated to indicate the wind velocity.

Weathervanes are employed in many instances as ornaments, as well as utilitarian devices, to indicate the direction from which the wind blows. Commonly, the weathervane comprises an upright support upon which is rotatably mounted on a vertical axis a vane or arrow constructed to be rotated by the wind, so that the arrow will always point into the wind and thus indicate its direction. It is contemplated by the present invention to provide on such a weathervane a simple device for indicating the velocity of the wind as well as its direction.

As illustrated in the present application, the device comprises an indicating arm movably mounted upon the weathervane in such a manner that the arm will be moved about its point of support by the wind, the amount of movement being in proportion to the velocity of the wind. Also, there is provided means for normally returning the arm toward an initial or zero position when the wind abates in velocity.

One object of the invention is to provide a combined wind gauge and weathervane of simple construction.

A further object of the invention is to provide a combined wind gauge and weathervane wherein the gauge will be mounted upon the movable part of the weathervane, so that the gauge will always face in the proper direction to be actuated by the force of the wind.

A still further object of the invention is to provide a combined wind gauge and weathervane of such construction that the device will be ornamental in appearance, simple in construction, and will satisfactorily indicate both the direction and velocity of the wind.

To these and other ends the invention consists in the novel features and combinations of parts to be hereinafter described and claimed.

Figure 1:
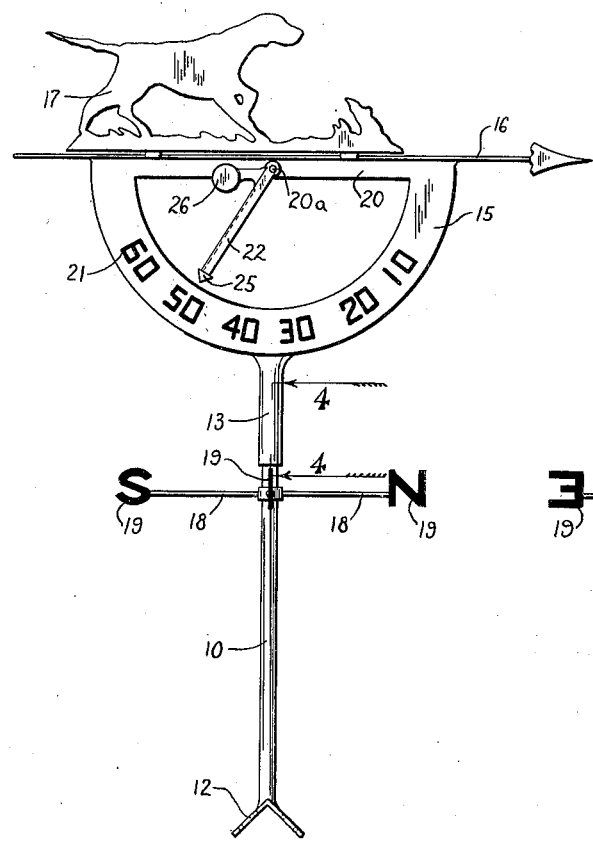
Fig. 1 is a front elevational view of a combined wind gauge and weathervane embodying my invention.
Figure 2:
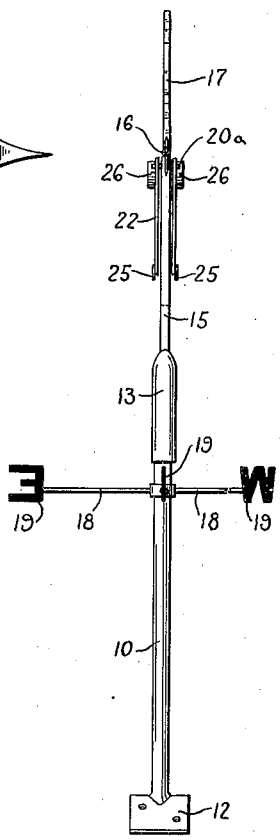
Fig. 2 is a side elevational view thereof.

To illustrate a preferred embodiment of my invention, I have shown in the drawings a combined wind gauge and weathervane comprising an upright standard 10 having a base or other means 12 by which it may be secured in place. The base is shown herein as being of V-shaped form, so as to be placed upon the ridge of a roof or gable.

Figure 4:
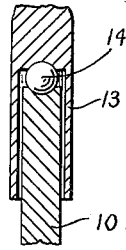
Fig. 4 is a detail sectional view on line 4—4 of Fig. 1.

Rotatably mounted upon the standard 10 is a stem 13, this stem being of sleeve-like or tubular form, as shown in Fig. 4, and telescoping over the upper end of the standard 10. Between the upper end of the standard 10 and the adjacent portion of the stem 13 is a ball bearing 14, so that the stem 13 will rotate freely upon the standard.

Carried at the upper end of the stem 13 is a member 15, of substantially semi-circular form, to the upper edge of which is secured the direction indicator or arrow 16. Also secured to the member 15 is a flat body 17 which may be of ornamental shape, this body being designed to catch the wind and insure that the arrow 16 points into the wind at all times.

Upon the standard 10 are secured four laterally extending arms 18, these arms carrying designations 19 of the four principal points of the compass, so that an observer can tell the direction in which the arrow 16 points.

It will be noted that, while the member 15 is of semi-circular shape, it is of open formation, and is provided with a horizontal bar 20 across the top, this bar being substantially the diameter of the semi-circle formed by the member 15. Upon the latter are indicia 21, in this instance shown in numbers from 10 to 60, to indicate the velocity of the wind.

Figure 5:
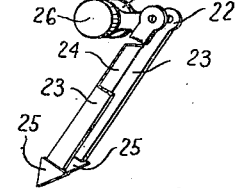
Fig. 5 is a detail perspective view of the movable arm of the wind gauge, certain parts being broken away.

Pivotally secured at the central portion of the bar 20, as at 20ª, is an indicating arm 22 which extends downwardly from the bar 20 to a point adjacent the inner or upper edge of the member 15. This arm may, as shown more especially in Fig. 5, comprise spaced parallel flange portions 23 which are connected by a web or body portion 24. At the lower ends of each of the flange portions 23 may be provided a pointed member or arrow 25 which cooperates with the indicia 21 upon the member 15 to indicate wind velocity.

It will thus be seen that the member 15 forms a semi-circular dial, and the member 22 forms a hand or arm cooperating with the indicia on the dial to indicate the velocity of the wind. It will also be understood that the indicia 21 will be provided upon each side of the dial member 15, and for that reason a flange 23 is provided at each side of the web member 24, so that there will be a pointer or indicator 25 upon each side of the dial.

Rigidly secured to the arm 22 is a counterweight 26, this counterweight under the action of gravity normally urging the arm 22 in a counterclockwise direction, as shown in Fig. 1, or toward that end of the dial having the smaller numerals thereon, and, therefore, toward a zero position on the dial.

It will be understood that the weathervane operates in the usual manner in that the stem 13 will be rotated by the wind to cause the arrow 16 to point in the direction from which the wind is blowing. Under these circumstances, the force of the wind will act at all times against the web 24 of the arm 22, thus causing this arm to be moved over the dial in a clockwise direction, as shown in Fig. 1, so that it will indicate the velocity of the wind. This movement of the arm 22 will be opposed by the counterweight 26 so that, when the wind diminishes in velocity, the arm 22 will again move toward the lower end of the scale on the dial.

Figure 3:
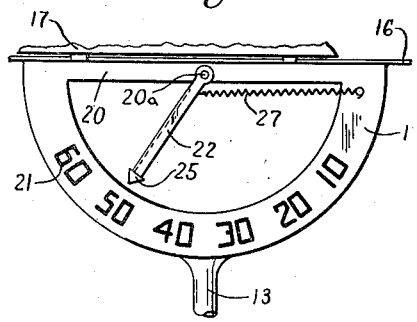
Fig. 3 is a fragmentary front elevational view of a modified form of my invention.

In Fig. 3 of the drawings, I have shown a slightly modified form of my invention. The only difference between this modification and the form of my invention previously described is that the counterweight 26 previously described is not employed. A spring 27 is substituted for this counterweight, one end of the spring being connected to the arm 22, and the other end being connected to the member 15, so that the arm 22 will be urged by the spring in a counterclockwise direction as shown in Fig. 3.

While I have shown and described some preferred embodiments of my invention, it will be understood that it is not to be limited to all of the details shown, but is capable of modification and variation within the spirit of the invention and within the scope of the claims.

What I claim is:

1. A combined wind gauge and weathervane comprising a support, a semi-circular member rotatably mounted on said support on a vertical axis, a bar extending across the top of said member, a vane rigidly carried by said bar substantially in the plane of said member, and a wind-actuated indicator pivoted to said bar on a horizontal axis and extending toward said semi-circular member.

2. A combined wind gauge and weathervane comprising a support, a semi-circular member rotatably mounted on said support on a vertical axis, a bar extending across the top of said member, a vane rigidly carried by said bar and extending substantially parallel thereto, a wind-actuated indicator pivoted to said bar on a horizontal axis and extending toward said semi-circular member, said member having indicia thereon, and said indicator having a pointer at the end thereof cooperating with said indicia.

3. A combined wind gauge and weathervane comprising a support, a semi-circular member rotatably mounted on said support, on a vertical axis, a bar extending across the top of said member, a vane rigidly carried by said bar substantially in the plane of said member, a wind-actuated indicator pivoted to said bar on a horizontal axis and extending toward said semi-circular member, and means urging said indicator toward a normal position in opposition to the action of the wind.

4. A combined wind gauge and weathervane comprising a support, a semi-circular member rotatably mounted on said support on a vertical axis, a bar extending across the top of said member, a vane rigidly carried by said bar substantially in the plane of said member, and a wind-actuated indicator pivoted to said bar on a horizontal axis and extending toward said semi-circular member, said indicator comprising a pair of spaced pointers and a web portion connecting said pointers.

5. A combined wind gauge and weathervane comprising a support, a semi-circular member rotatably mounted on said support on a vertical axis, a bar extending across the top of said member, a vane rigidly carried by said bar substantially in the plane of said member, a wind-actuated indicator pivoted to said bar on a horizontal axis and extending toward said semi-circular member, said indicator comprising a channel-shaped member having a central web portion and a lateral flange at each side of said web portion, and a point at the lower end of each flange.

6. A combined wind gauge and weathervane comprising a support, a semi-circular member rotatably mounted on said support on a vertical axis, a bar extending across the top of said member, a vane rigidly carried by said bar substantially in the plane of said member, a wind-actuated indicator pivoted to said bar on a horizontal axis and extending toward said semi-circular member, said indicator comprising a channel-shaped member having a central web portion and a lateral flange at each side of said web portion, a pointer at the lower end of each flange, and means to bias said indicator toward one end of said semi-circular member.

7. A combined wind gauge and weathervane comprising a support, a semi-circular member rotatably mounted on said support on a vertical axis, a bar extending across the top of said member, a vane rigidly carried by said bar substantially in the plane of said member, a wind-actuated indicator pivoted to said bar on a horizontal axis and extending toward said semi-circular member, there being an opening between said bar and said member, and said indicator being disposed in said opening whereby it is free for pivotal movement with the free end thereof moving along said member.

8. A combined wind gauge and weathervane comprising a support, a semi-circular member rotatably mounted on said support on a vertical axis, a bar extending across the top of said member, a vane rigidly carried by said bar substantially in the plane of said member, a wind-actuated indicator pivoted to said bar on a horizontal axis and extending toward said semi-circular member, and the pivotal point of said indicator being substantially at the center of said semi-circular member.

THOMAS F. HAMMOND.

REFERENCES CITED

The following references are of record in the file of this patent:

UNITED STATES PATENTS

| Number | Name | Date |
|---|---|---|
| 910,035 | Winder | Jan. 19, 1909 |
| 1,644,547 | Smith | Oct. 4, 1927 |
| 2,033,306 | Schofield | Mar. 10, 1936 |

FOREIGN PATENTS

| Number | Country | Date |
|---|---|---|
| 418,720 | France | Dec. 17, 1910 |
| 554,715 | France | June 15, 1923 |